United States Patent
Yamamoto et al.

[15] 3,700,736
[45] Oct. 24, 1972

[54] PREPARATION OF P-METHYLSULFONYL BENZALDEHHYDE

[72] Inventors: Michihiro Yamamoto, Takarazuka-shi; Kozo Shimago, Minoo-shi, both of Japan

[73] Assignee: Sumitomo Chemical Company, Ltd., Osaka, Japan

[22] Filed: July 16, 1969

[21] Appl. No.: 842,392

[52] U.S. Cl. ............260/607 A, 260/599, 204/162 R
[51] Int. Cl............................................C07c 147/06
[58] Field of Search.......260/599, 607 A; 204/162 R, 204/162 SH

[56]         References Cited

UNITED STATES PATENTS

| | | |
|---|---|---|
| 3,207,792 | 9/1965 | Buchanan et al. ......260/607 A |
| 2,180,772 | 11/1939 | Scherer .....................260/599 |
| 3,448,156 | 6/1969 | Taussig et al..............260/599 |

*Primary Examiner*—Bernard Helfin
*Attorney*—Stevens, Davis, Miller & Mosher

[57]              ABSTRACT

Para-methylsulfonylbenzaldehyde is readily produced by reacting methyl para-tolyl sulfone with bromine under heating to prepare novel para-methylsulfonylbenzylidene bromide, and subsequently hydrolyzing the resultant para-methylsulfonylbenzylidene bromide.

Para-methylsulfonylbenzaldehyde is useful as an intermediate for the production of medicines such as thiamphenicol.

3 Claims, No Drawings

PREPARATION OF P-METHYLSULFONYL BENZALDEHHYDE

The present invention relates to a process for producing para-methylsulfonylbenzaldehyde.

Para-methylsulfonylbenzaldehyde is a useful compound as an intermediate for production of medicines such as thiamphenicol and the like.

There have heretofore been known various processes for producing para-methylsulfonylbenzaldehyde. That is to say, there have been available (1) a process wherein para-methylsulfonylbenzonitrile is reduced to prepare the aldehyde (J. Chem. Soc., 1945, 639), (2) a process wherein methyl para-tolyl sulfone is oxidized with chromic anhydride in acetic anhydride and sulfuric acid to prepare the diacetate thereof and the obtained diacetate is further hydrolyzed (Japanese Pat. Publication No. 3073/1951), (3) a process wherein methyl para-tolyl sulfone is oxidized with manganic sulfate in diluted sulfuric acid (Japanese Pat. Publication No. 2628/1954), (4) a process wherein para-methylsulfonylbenzyl bromide is reacted with hexamethylenetetramine in chloroform to prepare the hexamethylenetetramine salt thereof and the obtained salt is further hydrolyzed in aqueous acetic acid (J. Chem. Soc., 1962, 1425) and the like. However, these prior processes have respectively some difficult points in the large scale manufacture, such as that the starting materials are not readily utilized, or relatively expensive solvent or a troublesome oxidizing agent is required.

The present inventors have found that para-methylsulfonylbenzaldehyde can be readily and economically obtained in high yield by brominating methyl paratolyl sulfone which is produced readily from para-toluenesulfonyl chloride, under heating to prepare novel para-methylsulfonylbenzylidene bromide, and subsequently hydrolyzing the resultant para-methylsulfonylbenzylidene bromide.

One of the objects of the present invention is to provide a commercially advantageous process for producing para-methylsulfonylbenzaldehyde.

Another object of the present invention is to provide para-methylsulfonylbenzylidene bromide which is a novel compound.

Other objects of the present invention will become apparent from the detailed description given hereinbelow.

In order to accomplish these objects, the present invention provides a process for producing para-methylsulfonylbenzaldehyde which comprises contacting para-methylsulfonylbenzylidene bromide with water.

Further the present invention provides a process for producing para-methylsulfonylbenzaldehyde, which comprises contacting methyl para-tolyl sulfone with bromine at a temperature of 100° to 200°C to prepare para-methylsulfonylbenzylidene bromide, and contacting the resultant para-methylsulfonylbenzylidene bromide with water.

Para-methylsulfonylbenzylidene bromide referred to the present invention is a novel compound which has not heretofore been described in literatures.

The reaction formula in the present invention is as follows:

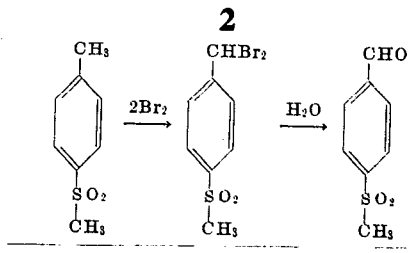

Details of the procedure of the present invention will be illustrated hereinbelow.

In the bromination, 2 or somewhat more moles of dried bromine is slowly added dropwise to one mole of fused methyl para-tolyl sulfone at 100° to 200°C, preferably 140° to 190°C, in a reactor in such rate that the unreacted bromine scarcely flow out from the reactor. Although it is not always necessary to carry out the reaction under radiation of light, but the rate of the reaction can be remarkably accelerated by the radiation of light. Thereafter para-methylsulfonylbenzylidene bromide are obtained as white crystals in good yield by dissolving the reaction product in an adequate organic solvent such as, for example, alcohols, ethyl acetate, chloroform and the like, ice-cooling the resultant solution to separate crystals after the treatment with decolorizing carbon collecting the crystals by filtration, washing, if required, with a mixture of petroleum ether-alcohol (9 : 1), and drying the crystals. In said bromination, formation of mono-and tribrominated derivatives are unavoidable, but they are negligible for obtaining the objective aldehyde.

Subsequently the para-methylsulfonylbenzylidene bromide obtained by the bromination is hydrolyzed after purification or without being purified. In the present invention, to hydrolyze the said bromide, a suspension of the bromide is stirred under heating in an aqueous reaction medium for several to several 10 hours, for example, for 5 – 10 hours at 100°C. The suspension is converted to a homogenous solution after the completion of the reaction. The reaction temperature is not specifically defined but is preferably 30° to 100°C. At that time, the reaction can further proceed smoothly with the addition of a small amount of an anti-foaming agent such as, for example, butyl alcohol, amyl alcohol, octyl alcohol and the like. After the reaction is over para-methylsulfonylbenzaldehyde is isolated in good yield by ice-cooling the resultant solution, collecting the white crystals by filtration, washing the crystals first with a dilute aqueous alkali solution, then with water and drying the resultant crystals. In this hydrolysis, a reaction medium suitably employed is, for example, mere water or an aqueous solution containing an acid, alkali or alkaline salt which is usually used for the hydrolysis of a halogen compound. Particularly, the existence of a mineral acid such as sulfuric acid, hydrochloric acid, nitric acid and the like is useful for accelerating the rate of the hydrolysis.

The melting point and infrared absorption spectrum of the aldehyde thus obtained coincide completely with values shown in literatures as well as with the standard compound, which shows that there is no necessity of effecting further purification.

The present invention will be further substantially explained with reference to the following examples, but it is not intended to limit the present invention.

EXAMPLE 1

Step 1:

Methyl para-tolyl sulfone (170 g) is heated and stirred at 180° to 185°C, and dried bromine (108 ml) is added dropwise under the surface of the liquid at the same temperature in the course of 250 minutes while illuminated with a 200-watt tungsten lamp. The resultant dark brown reaction product is dissolved in 1 liter of hot ethyl acetate, and the resultant solution is cooled with ice after the treatment with decolorizing carbon, to give white crude crystals of para-methylsulfonylbenzylidene bromide (270 g). Melting point: 135°C.

Recrystallization of a sample from ethanol gives prisms having a melting point of 136°–137°C.

Elementary Analysis

|  | C | H | Br |
|---|---|---|---|
| Calculated values (%) | 29.27 | 2.44 | 48.78 |
| Measured values (%) (calculated for $C_8H_8Br_2O_2S$) | 29.11 | 2.56 | 48.65 |

Step 2:

The bromide (131 g) obtained in step 1 is suspended in 1.6 liters of a 20 percent aqueous sulfuric acid solution. The resultant suspension is stirred well under reflux for 5 hours. Thereafter, the reaction mixture is cooled with ice and the separated white crystals are collected by filtration, washed with a cold 2 percent aqueous sodium hydroxide solution, and then with water and dried to give para-methylsulfonylbenzaldehyde (66.4 g), m.p. 156°–158°C.

EXAMPLE 2

Step 1:

Methyl para-tolyl sulfone (170 g) is heated and stirred at 170° to 175°C, and at the same temperature dried bromine (108 ml) is added thereto dropwise in the course of 280 minutes in the light of a 200-watt tungsten lamp. Thereafter, the resultant mixture is treated in the manner similar to that in the step 1 of example 1. There are obtained crude crystals of para-methylsulfonylbenzylidene bromide (292 g), m.p. 132°C.

Step 2:

The bromide (131 g) obtained in step 1 is suspended in 1.8 liters of water. The suspension is refluxed for 6 hours with stirring, and the resultant solution is treated in the manner similar to that in step 2 of example 1. There are obtained white crystals of para-methylsulfonylbenzaldehyde (64.5 g), m.p. 156°–157°C.

EXAMPLE 3

A mixture of para-methylsulfonylbenzylidene bromide (131 g) obtained by the method similar to that in step 1 of example 1, water (800 ml) and conc. hydrochloric acid (400 ml) is refluxed for 270 minutes with stirring, and then the resultant mixture is treated in the manner similar to that in the step 2 of example 1 to give white crystals of para-methylsulfonylbenzaldehyde (65.6 g), m.p. 156°–157°C.

What we claim is:

1. A process for producing para-methylsulfonylbenzylidene bromide consisting essentially of slowly adding dropwise 2 or somewhat mols of dried bromine to 1 mol of fused methyl para-tolylsulfone at a temperature of 100°–200°C. in a reactor at a rate such that the unreacted bromine scarcely flows out from the reactor wherein the reaction is carried under light radiation.

2. A process according to claim 1, wherein the temperature is 140°–190° C.

3. Para-methylsulfonylbenzylidene bromide.

* * * * *